C. & P. KNOPF.
RECORDING SPEEDOMETER.
APPLICATION FILED DEC. 26, 1912.
1,097,590.
Patented May 19, 1914.
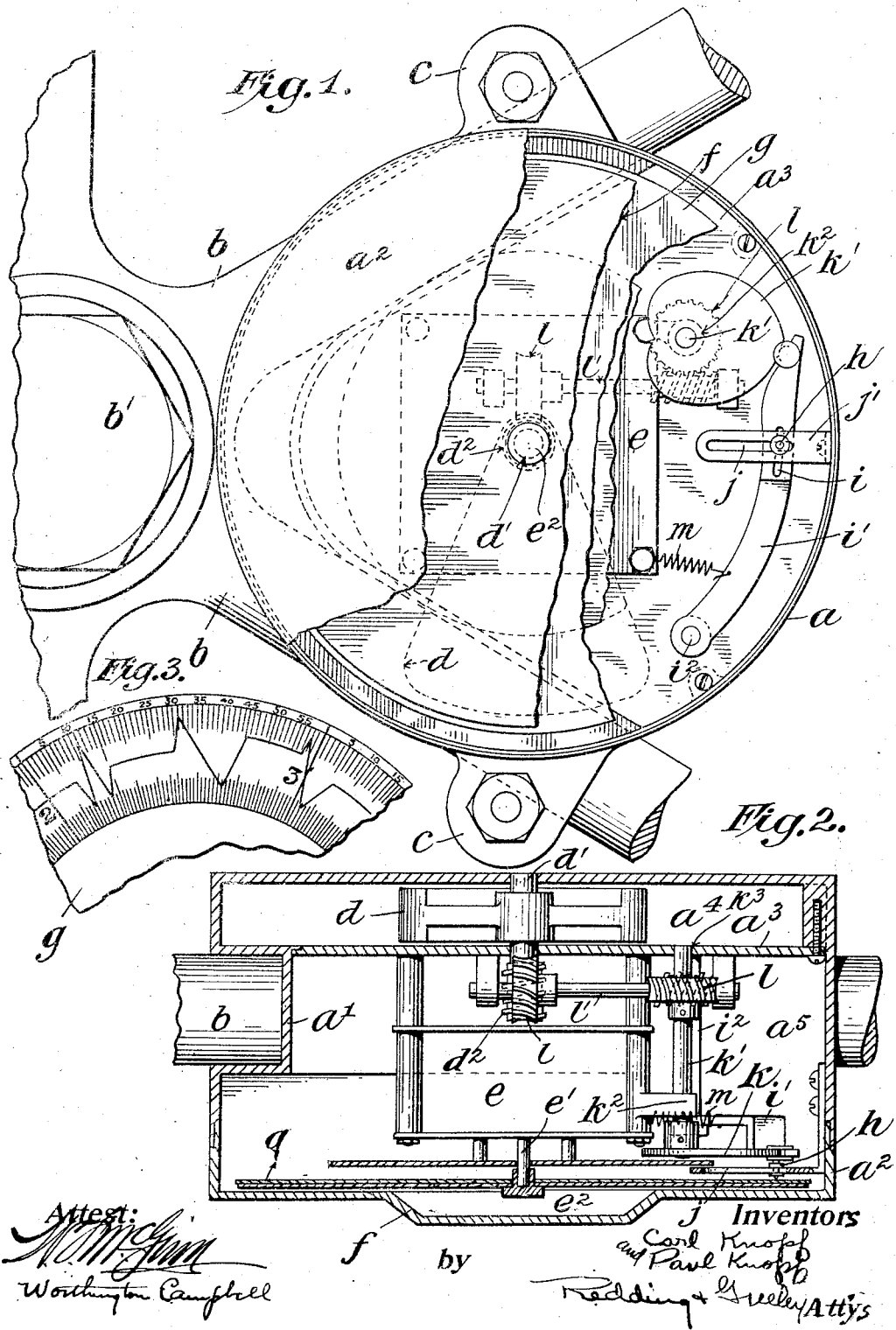

UNITED STATES PATENT OFFICE.

CARL KNOPF AND PAUL KNOPF, OF NEW YORK, N. Y., ASSIGNORS TO KNOPF BROTHERS MANUFACTURING COMPANY, OF NEW YORK, N. Y., A CORPORATION OF NEW YORK.

RECORDING-SPEEDOMETER.

1,097,590.  Specification of Letters Patent.  Patented May 19, 1914.

Application filed December 26, 1912. Serial No. 738,537.

*To all whom it may concern:*

Be it known that we, CARL KNOPF and PAUL KNOPF, citizens of the United States, residing in the borough of Manhattan of the city of New York, in the county of New York, in the State of New York, have invented certain new and useful Improvements in Recording-Speedometers, of which the following is a specification, reference being had to the accompanying drawings, which form a part hereof.

This invention relates to that type of recording instruments which operate on the principle of the ordinary speedometer and which include a stylus oscillated by the revolutions of a wheel of the vehicle across the face of a continuously moving tape, dial or the like, graduated in convenient units, to record thereon the time at which the vehicle was used and the distance through which it traveled, from which the speed at any given period may be computed. The tape or dial, together with the means for moving the same continuously and the stylus are usually mounted on the dash or other portion of the vehicle near the driver's seat while the actuating mechanism for the stylus has hitherto been impelled through a flexible shaft or its mechanical equivalent operatively connected with one of the wheels of the vehicle. Such a flexible connection has not proved to be entirely satisfactory since it is constantly rendered inoperative by the ravages of the elements and the deposit of foreign particles therein, such as dust, etc. Then too, it involves the employment of a number of moving parts such as gears, housings, shafting, etc. which are likewise exposed to injury. This exposed mechanism may be deranged or tampered with by the operator of the vehicle when, as is so often the case, it is to his interest to destroy all evidence of the use of the car or the nature of such use, such as the speed, distance and duration thereof.

It is an object of this invention to render unnecessary the use of such a flexible connection or its mechanical equivalent and to mount the recording mechanism in juxtaposition to the actuating means therefor.

Another object is to inclose all of the parts of the instrument in a single casing thus forming a compact structure which may be shipped readily and attached to or detached from the wheel of the vehicle without the assistance of a skilled mechanic.

A further object is to make this casing dust-proof and substantially air-tight so that the parts of the instrument are not liable to deterioration by causes other than natural.

Another object is to render more simple than hitherto the actuating mechanism for the stylus by reducing the number of moving parts thereof and to provide for the invariable operation of the same. In accordance with this object the casing inclosing all of the parts of the instrument is mounted on a wheel of the vehicle so as to rotate bodily therewith and gravity means operable by the movement of the casing are disposed within said casing and connected to the stylus.

Further improvements in the general construction of the type of instrument herein illustrated will appear as this description proceeds.

Reference is now to be had to the accompanying drawings, in which—

Figure 1 is a view in elevation of the casing, the front being broken away to show the improved mechanism, one manner of mounting the casing on a wheel being indicated. Fig. 2 is a sectional view of the same showing more particularly the connections between the stylus and the gravity operated actuating mechanism therefor. Fig. 3 is a fragmentary view of a portion of a dial indicating clearly a record thereon of the use of a vehicle.

In the embodiment herein illustrated the casing $a$ is of substantially cylindrical shape being provided, however, in its walls with a recess $a'$ in which the two approximate converging spokes $b$ of the vehicle wheel are adapted to fit snugly. The casing, preferably in the interests of rigidity, is mounted between the spokes at a point very near the hub $b'$ of the wheel so that, by reason of the angularity of the spokes, two corresponding clamps $c$ each in engagement with a spoke, will be sufficient to hold the casing in fixed position against the centrifugal force tending to dislodge the same. The casing in the embodiment illustrated, is preferably of a width less than the width of the hub or the rim so that it is less liable to be struck by miscellaneous objects by which it might be damaged. It should be emphasized here that this invention is not limited to the specific means for mounting the recording mechanism on a wheel nor to the exact location of such recording mechanism thereon. For instance, it may be desirable to mount the recording device on the hub of the wheel, which is an entirely feasible scheme, as will appear when the actuating mechanism for the recording chart is described. In some instances it may be desirable to mount the entire mechanism near the periphery of the wheel. All such changes of location and modifications in the mounting means are to be deemed within the purview of this invention.

A suitable cover $a^2$ may be provided for the casing and owing to the conditions of use of the instrument it has been found desirable to have the cover in tight frictional engagement with the casing so as to prevent the entrance of dust or the like. Obviously, however, other means may be employed to effect a suitable union of the two. The interior of the casing is divided by a removable transverse partition $a^3$ into two compartments $a^4$ and $a^5$. In the compartment $a^4$ is suspended on a shaft $d'$ preferably axially of the casing, a weighty segment $d$, having its center of gravity as far removed from its axis as is consistent with compactness, for a purpose which will later appear.

In the compartment $a^5$ may be mounted a suitable clock mechanism $e$ having a main shaft $e'$ on which may be secured removably, a metallic or inflexible disk $f$ by means of any convenient fastener $e^2$. On one face of the metallic disk $f$ may be secured a second disk $g$ of card-board or the like, which is suitably graduated into convenient units of time as will be more fully hereinafter pointed out. The purpose of the first named disk is merely to form a support for the card disk $g$ when the stylus is recording thereon, as will be understood from the following description.

Operatively disposed with respect to the card disk $g$ is a stylus or marker $h$ of any approved form. This stylus has its shank disposed in a slot $i$ formed in an oscillating arm $i'$ pivotally mounted on a shaft $i^2$ secured in the casing $a$. The stylus $h$ also rests in a slot $j$ formed in a bracket $j'$ secured to the wall of the casing $a$ and projecting toward the center of the casing along a radial line thereof. The slot $i$ in the arm $i'$ is disposed substantially at right angles to the slot $j$ in the bracket $j'$ so that while the oscillations of the arm $i'$ cause a corresponding movement of the stylus $h$ such movement is necessarily truly radial with respect to the casing $a$ and the card disk $g$.

In operative engagement with the arm $i'$ is a cam $k$ of any approved form whereby to impart an oscillatory movement to said arm, mounted on a shaft $k'$ disposed in suitable bearings $k^2$ and $k^3$ secured within the casing. In the present embodiment the cam $k$ is pear-shaped, the arm $i'$ being held in engagement with the face thereof by a suitable spring $m$. When desirable, however, a grooved cam having a positive engagement with the arm $i'$ may be substituted. The shaft $k'$ of the cam $k$ is operatively connected to the shaft $d'$ of the suspended weighty segment $d$ through suitable gearing $l$ and shafting $l'$. The shaft $d'$ of the segment $d$ is provided with a worm $d^2$ in engagement with one of the spiral gears $l$ so that rotation of the shaft of the segment imparts a rotating movement to the cam $k$. The purpose of the interposed gearing and shafting $l$ and $l'$ between the cam $k$ and the shaft $d'$ of the cam $d$, is to reduce the speed at which the cam $k$ is rotated, to any desired extent. In this way a single oscillation of the stylus $h$ with respect to a given linear distance through which the vehicle travels, may be insured.

In operation, a suitable disk of card-board or the like is placed in engagement with the metallic supporting disk $f$ and the two are secured to the shaft $e'$ of the clock works by means of the cap $e^2$. This card $g$ has a marginal portion thereof graduated in hours and minutes as indicated in Fig. 3. The stylus or marker $h$ is in engagement with this graduated marginal portion and the length of its oscillations are fixed so as never to leave the graduated portion. When the vehicle is at rest, it will be understood that the disk $g$ is moved by the clock work with respect to the stylus $h$, which at this time remains stationary. The mark then traced on the face of the disk will be substantially concentric with the axis thereof. When the vehicle is started, the entire casing $a$ will be moved bodily so that the suspended segment $d$, by reason of its weight, will receive a combined motion of rotation about its own shaft $d$ and of pure translation about the axle of the vehicle. The segment will always tend to have its center of gravity at the lowest point possible, which will, of course, be below the shaft thereof and in order to retain this lowermost position, the shaft of the segment $d$ will, during one revolution of the vehicle wheel make one complete revolution with respect to the casing. This rotating movement will be imparted to the cam $k$ in the manner hereinbefore described and the rotations of the cam $k$ will impart an oscillating movement to the arm $i'$ and the stylus $h$. This oscillating movement will be recorded on the graduated portion of the disk $g$. If the speed of the vehicle be high, these marks will appear in a substantially radial position with respect to the disk $g$ but if the speed of the vehicle decreases the marks will appear more nearly tangential to the radii of the disk $g$.

Reference to Fig. 3 shows that the vehicle on which the disk was used remained stationary from two o'clock until substantially eight minutes past two when it moved at a relatively high speed until fifteen minutes past two, when it remained stationary for fifteen minutes, after which it moved at a slow speed until about fifteen minutes before three o'clock when it was stopped for a time, and etc. As it is known that the stylus moves a certain distance for a given travel of the vehicle, the speed for any period of use may be computed readily from the data obtained from the chart.

It will be understood that the dial $g$ may be removed as often as is necessary and a new dial placed in position. It will also be evident, that any suitable locking arrangement may be employed to secure positively the cover $a^2$ to the body of the casing $a$ so as to prevent the insertion of a new card or the alteration of the one in operative position, thus affording a certain check on the travel of the vehicle.

Modifications of the structure herein described will suggest themselves to those skilled in the art, but it is to be understood that any embodiment of such a recording device as is herein shown, in which the chart and marker are mounted on and operated by the revolution of a wheel is to be deemed within the spirit of this invention.

What we claim is:

1. A recording device including a moving chart, a marker mounted in operative position with respect thereto, a cam in operative engagement with the marker to oscillate the same, means to rotate the cam including a weight pivotally suspended in stable equilibrium, a case in which all of said parts are disposed, and means to mount the case on a wheel of the vehicle whereby bodily movement of the case and rotation of the weight with respect thereto is caused by the revolution of the wheel.

2. A recording device including a case mounted on the wheel of a vehicle, a clock mechanism mounted in the case, a graduated disk adapted to be rotated continuously by said clock mechanism, a stylus in engagement with the face of the graduated disk, an oscillating arm on which the stylus is mounted, a slotted guide supported by the wall of the case and in which the stylus is disposed to insure a radial movement thereof with respect to the disk, a cam within the case to oscillate said arm, and a weighty segment suspended pivotally in said case and in operative connection with the cam, rotation of the wheel on which said case is mounted causing rotation of the segment with respect to the case.

3. A recording device including a case mounted on the wheel of a vehicle, a clock mechanism mounted in the case, a graduated chart adapted to be moved continuously by said clock mechanism, a stylus in engagement with the face of the chart, an oscillating arm on which the stylus is mounted, a slotted guide in which the stylus is disposed to insure an invariable transverse movement across the face of the chart, a cam within the case to oscillate said arm, and a weighty segment suspended pivotally in said case and in operative connection with the cam, rotation of the wheel on which said case is mounted causing rotation of the segment with respect to the case.

This specification signed and witnessed this 24th day of December A. D., 1912.

CARL KNOPF.
PAUL KNOPF.

Signed in the presence of—
HARRY E. POST,
WORTHINGTON CAMPBELL.